(No Model.)

J. B. ROMINE.
CULTIVATOR.

No. 396,712. Patented Jan. 22, 1889.

WITNESSES,
T. W. Fowler
W. H. Patterson

INVENTOR,
Joseph B. Romine
per A. H. Evans & Co.
Attorneys.

UNITED STATES PATENT OFFICE.

JOSEPH B. ROMINE, OF GERMANTOWN, NEBRASKA.

CULTIVATOR.

SPECIFICATION forming part of Letters Patent No. 396,712, dated January 22, 1889.

Application filed October 24, 1888. Serial No. 289,024. (No model.)

*To all whom it may concern:*

Be it known that I, JOSEPH B. ROMINE, a citizen of the United States, residing at Germantown, in the county of Seward and State of Nebraska, have invented certain new and useful Improvements in Cultivators, of which the following is a full and clear description, reference being had to the accompanying drawings, forming part of this specification, in which—

Figure 1:
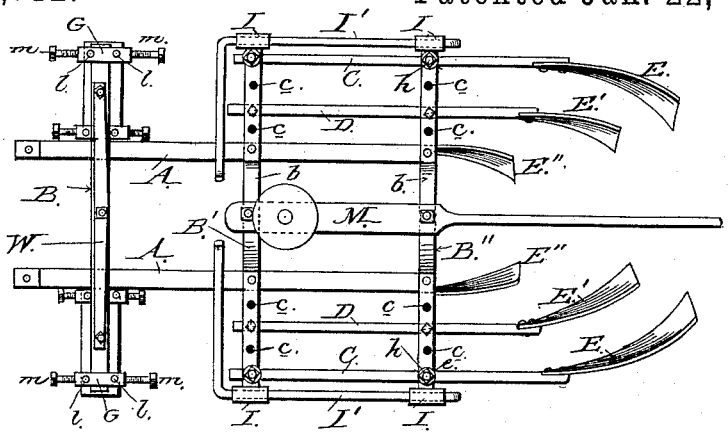
Figure 2:
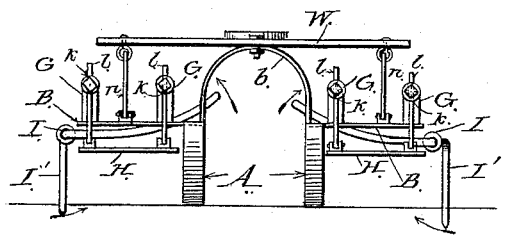
Figure 3:
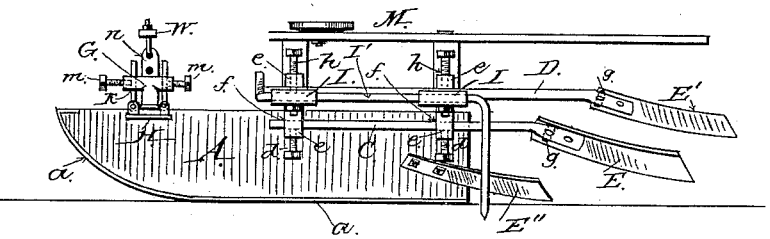
Figure 4:
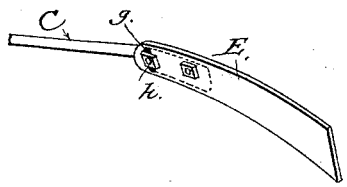

Figure 1 represents a plan view of a cultivator with my improvements attached. Fig. 2 is a front elevation of the same. Fig. 3 is a side elevation. Fig. 4 is a detail of one of the plows or shovels.

My invention relates to certain improvements in cultivators; and it consists in the constructions and combinations of devices which I shall hereinafter fully describe and claim.

The object of my invention is to construct a simple, substantial, and effective machine for cultivating corn, and which shall be so constructed as to cultivate the soil and destroy the weeds and grass upon the tops and sides of the ridges and between said ridges.

Referring to the drawings, A A represent suitable runners, which are separated from each other a suitable distance and provided with metallic shoes or wearing-surfaces $a$; and B, B', and B'' indicate suitable transverse beams or plates, which are secured to the top surfaces of the runners at points at or near the front, rear, and middle portions, as shown in Fig. 1. The central portions of the transverse plates B, B', and B'' are arched, as shown at $b$, to permit the passage of the growing corn, and the extending sides of the plates B' B'' are provided with holes $c$, in which are secured, by bolts $d$, studs or standards $e$, having openings $f$, in which are journaled the cylindrical beams or rods C and D, each of which carries at its rear end a curved shovel or plow, E E'.

The shovels or plows E are bolted directly to the rear ends of the beams or rods C, and they are provided with slots $g$, through which and into the beams or rods bolts $h$ pass, whereby the inclination of the shovels may be varied to increase or decrease the depth of penetration of their points, or to increase or lessen the amount of soil which is thrown around the growing corn.

The beams or rods D are mounted similar to the beams C, but in a plane somewhat above said beams C, and they are provided with shovels or plows E', similar in construction and attachment to the shovels or plows E; but as they occupy a plane above the shovels E they may be adjusted by means of their cylindrical beams or rods and the set-screws $h$, which enter the top of the standards or studs $e$, so that said shovels or plows may be made to occupy a horizontal position above the shovels E and on top of the ridge of listed corn, whereby any grass or weeds which pass over the shovels E will be caught by the edges of the horizontally-placed shovels E' and be severed. In this case it will be understood the shovels E' do not throw much, if any, soil into the furrow or ditch, but are used principally as knives to cut the weeds and grass.

To the rear ends of the runners are also secured shovels or plows E'', which penetrate the soil at the bottom of the furrow to a depth of three inches, (more or less,) whereby said shovels loosen up the soil, destroy the weeds, and draw the loose soil to and around the stems of the plants.

The transverse beam or plate B at the front ends of the beams is provided with T-shaped standards G at its projecting side portions, said standards being provided with holes $k$, through which rods $l$ vertically pass, the said rods being hinged at their lower ends to plates or "float-boards" H, one of which is placed at each side of the front portion of the runners and immediately below the outwardly-extending portions of the beam B.

The plates or boards H will preferably be steel slabs about three-sixteenths of an inch thick and ten inches wide, and they are raised and lowered by means of the rods $l$ and suitable set-screws $m$, which pass into the ends of the standards G and bear against the said rods.

The floats serve a twofold purpose—first, they prevent the machine having the rocking motion which it would otherwise have by reason of its narrow base; and, second, they are designed to slide on the ground with their front edges slightly elevated, whereby they break the clods and pulverize the soil, while the floats may be elevated sufficiently to permit the passage of any corn-stumps, hard clods, stones, &c. When corn is planted with the "lister," it leaves the ground in high ridges between the rows, and each time said rows are cultivated these ridges are accordingly lowered. Therefore it is necessary that the floats be constructed so that they may be adjusted with relation to the height of the ridges. This feature, however, is accomplished by means of the rods $l$ and set-screws $m$, previously mentioned.

On top of the arch in the plate B, I pivot any well-known form of doubletree, W, and connect the outer ends of the same by means of loose links $n$ with the projecting side portions of the beam B, and to these links, or to the doubletree, singletrees may be attached in any suitable manner.

Secured to the arches in the beams B' B" is a beam, M, which carries near its front end the driver's seat, while its rear end projects beyond the runners and is formed with a handle, whereby when the machine arrives at the end of one row the operator turns his team, and by grasping this handle is permitted to turn the machine, so that it may be started straight in the adjoining row.

In using the cultivator in corn not planted with a lister—as, for instance, on the side of a hill—the rear end of the machine will slip down and the shovels will cut off the young corn. This objection, however, I overcome by journaling in sockets I in each of the outer ends of the beams B' B" a bent rod, I', the front end of which is turned inward, so as to be readily engaged by the operator's foot, while the rear end stands when in operative position in an approximately vertical position, and is designed to enter the ground and to serve as a rudder for guiding the movement of the machine.

The rods I' when not in use may have their front ends thrown upward, thereby elevating the rear ends, which enter the ground, and in practical use the rod nearest the side of the hill will be thrown into operative position, its point being thrust into the ground to draw the machine toward it, for the purpose previously stated.

From this description it will be seen that I am enabled to construct a strong and simple machine for cultivating corn, and I so arrange the operative parts of said machine that they are readily adjusted from one position to another to facilitate the more effective cultivation of the soil.

Having thus described my invention, what I claim as new, and desire to secure by Letters Patent, is—

1. In a cultivator, the runners and the transverse beams or plates having the projecting side portions with the adjusting-holes therein, in combination with the cylindrical beams, the standards secured in said holes and having sockets in which the beams are adjusted, set-screws for holding the beams in their adjusted positions, and adjustable slotted shovels or plows on the rear ends of the beams, substantially as herein described.

2. In a cultivator, the runners and the transverse plates or beams B B' B", having arched central portions and projecting side portions, standards carried by said side portions and adjustable in holes therein, cylindrical beams journaled in said standards, and adjustable slotted shovels or plows on the rear ends of the beams, substantially as herein described.

3. In a cultivator, the combination of the runners, the transverse beams or plates, the shovels with their beams and suitable vertically-adjustable floats or plates near the front of the machine and adapted to rest upon the ground, whereby clods are crushed and rocking motion of the machine prevented, substantially as herein described.

4. In a cultivator, the runners, the transverse plates B B' B", the adjustably-secured standards, the beams C D, journaled therein, and the shovels or plows carried by said beams, in combination with T-shaped standards carried by each projecting side portion of the front plate, B, horizontally-placed plates or floats beneath said projecting side portions, hinged pins attached to said plates and passing through the T-standards, and set-screws for adjustably securing said pins, whereby the floats or plates may be raised or lowered, substantially as herein described.

5. In a cultivator, the runners, the shovels and beams, and the transverse beams B' B", having tubular sockets in their outer ends, in combination with bent rods I, journaled in the tubular sockets and provided with inwardly-turned front portions, and having the rear portions adapted to enter the ground and serve as rudders for the machine, substantially as described.

JOSEPH B. ROMINE.

Witnesses:
R. P. ANDERSON,
GEO. H. TERWILLIGER.